UNITED STATES PATENT OFFICE.

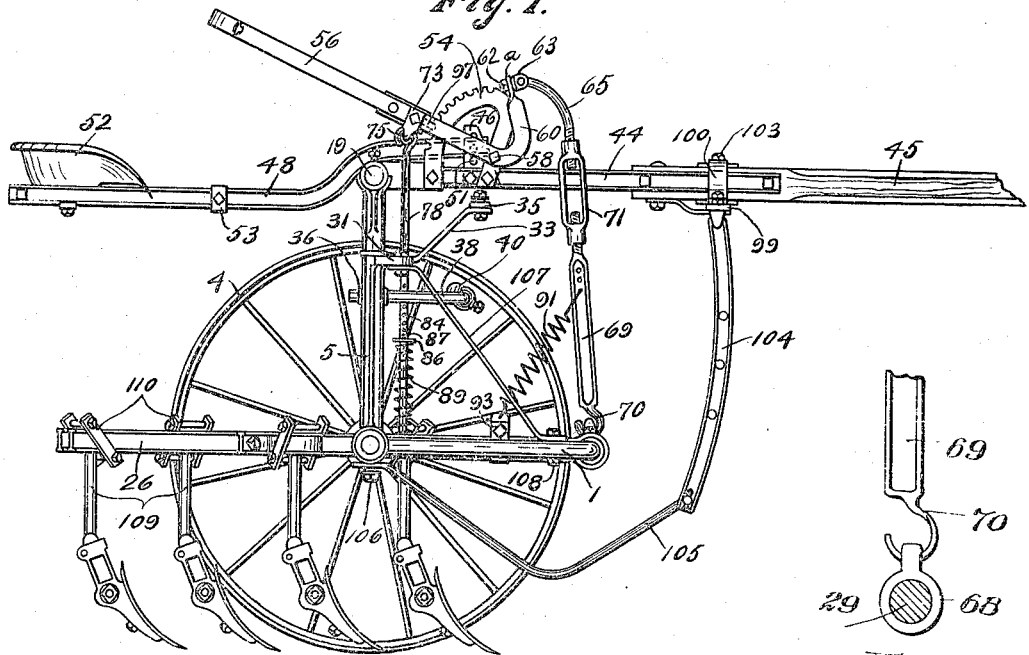
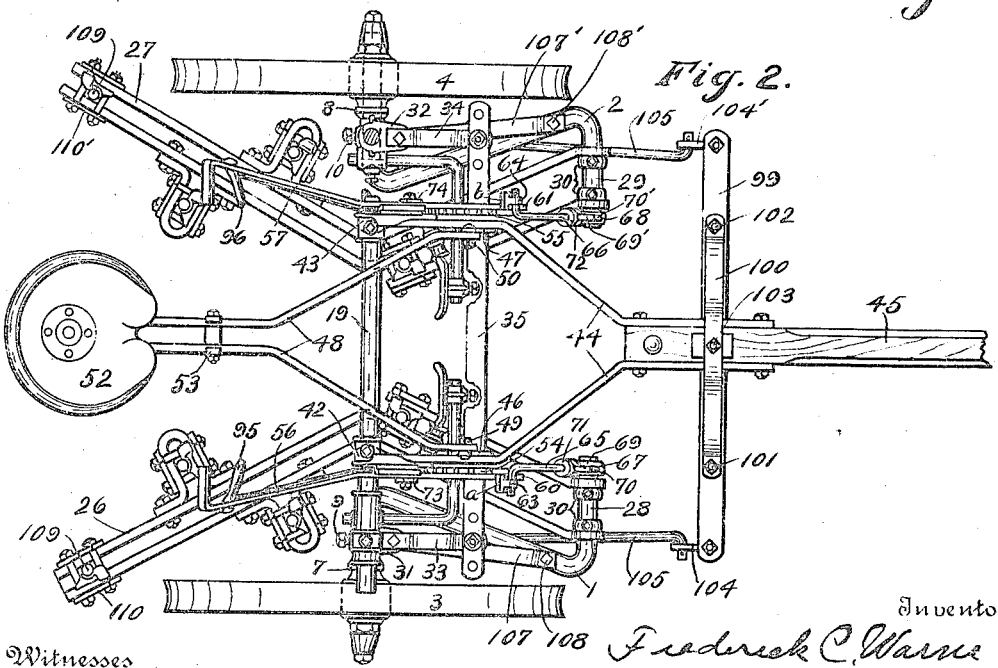

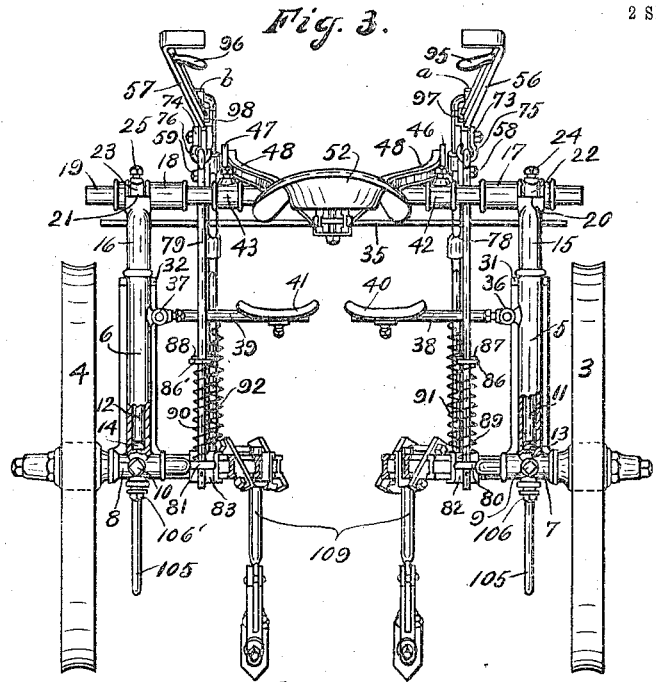

FREDERICK C. WARNE, OF MANSFIELD, OHIO, ASSIGNOR TO THE RODERICK LEAN MANUFACTURING COMPANY, OF MANSFIELD, OHIO, A CORPORATION OF NEW JERSEY.

CULTIVATOR.

1,036,940.          Specification of Letters Patent.      Patented Aug. 27, 1912.

Application filed July 3, 1911. Serial No. 636,969.

*To all whom it may concern:*

Be it known that I, FREDERICK C. WARNE, a citizen of the United States of America, residing at Mansfield, in the county of Richland and State of Ohio, have invented certain new and useful Improvements in Cultivators, of which the following is a specification.

My invention relates to pivot cultivators. The objects of my invention are to provide means of pivoting the wheels, axles and beams to operate simultaneously and at the same time maintain the same relation between the beams, axles and wheels; to provide means for actuating the beams whereby the cultivating devices will dodge any obstruction in their path and make them travel to correspond with any irregularity in the rows; to provide means of automatically exerting a varying downward pressure on the beams to force the cultivating devices into the soil to meet the different conditions thereof; to provide automatic means of assisting the operator in lifting the beams; to provide means of adjusting or regulating the depth of the cultivating devices in the soil; to provide means of attaching the beams to the cultivator whereby the cultivating devices which are secured to the forward ends of the beams are located ahead of the axle pivot point; to provide means of throwing the wheels, axles and pivot sleeves backward with relation to the cultivator when the rear ends or beams are raised thereby balancing the frame and raising the beams simultaneously; to provide means of giving uniform and simultaneous lateral movement to both plow-beams. These and other objects are accomplished by the mechanism illustrated in the accompanying drawing and described in this specification and particularly pointed out in the claims.

Figure 1 represents a side elevation of the cultivator showing one of the beams in position to penetrate the soil and the corresponding positions of the mechanism connected thereto. Fig. 2 is a plan view of the cultivator. Fig. 3 is a rear view of the cultivator with a part broken away. Fig. 4 is a side elevation of the cultivator showing one of the beams in its idle position and the corresponding positions of the mechanism connected thereto. Fig. 5 is an enlarged view of collars fitted to the axles and their connections.

Referring to the drawings, reference numerals 1 and 2 indicate axles made substantially Z shape and upon which are mounted the wheels 3 and 4. Vertical sleeves 5 and 6 having transverse journal bearings 7 and 8 are journaled on the axles adjacent to the hubs of the wheels and are rigidly secured and held in a vertical position by the set screws 9 and 10. Shafts 11 and 12 are inserted in the sleeves and their free ends are supported by the washers 13 and 14. Brackets 15 and 16 are fitted to the upper extremities of the shafts 11 and 12 and are provided with horizontal portions 17 and 18 into which the axle or shaft 19 is fitted.

In the journal portions 17 and 18, openings 20 and 21 are provided into which collars 22 and 23 are inserted and fitted to the shaft 19 and held in any laterally adjusted position by the set-screws 24 and 25 thereby holding the brackets at different distances from each other and providing means of increasing or decreasing as desired the space or lateral distance between the travel of the beams 26 and 27 which are attached to the brackets 15 and 16 for cultivating rows of different widths.

The forward ends of the beams 26 and 27 are pivotally connected for vertical movement to the inwardly projecting ends 28 and 29 of the axles 1 and 2 and held against lateral movement by the adjustable collars 30—30 leaving the rear ends of the beams free to float or follow the machine when being dragged by the portions 28 and 29 of the axles 1 and 2. The vertical sleeves 5 and 6 are provided with forwardly projecting ledge portions 31 and 32 and recesses to engage the ends of the upwardly extending supports 33 and 34 and are connected together by the link bar 35 which pivotally connects the vertical sleeves together for simultaneous movement.

Ears 36 and 37 are provided on the vertical sleeves 5 and 6 and project inwardly at right angles to the ledges 31 and 32 and carry tight angle levers 38 and 39 having attached thereto the stirrups 40 and 41. Forwardly projecting brackets 42 and 43 are fitted and rigidly secured to the shaft 19 by set screws and the free ends of the frame bars 44—44 are securely attached to said brackets. The opposite ends of the frame bars being attached to the tongue 45.

Seat lever supports 46 and 47 are attached to the frame bars 44—44 by bolts or other well known fastening means. A seat lever 48 is pivotally connected to the seat lever supports by the bolts 49 and 50 which pass through one of a series of apertures 51 which are provided in said lever supports. The seat lever 48 rests upon the top of the axle 19 and is provided with a seat 52 which can be adjusted in a horizontal direction to increase or decrease the leverage of the seat lever 48 and to bring the operator closer to or farther away from the stirrup to accommodate different sizes of men. A clamp 53 fits over the bars comprising the seat lever 48 and prevents the bars from spreading.

Notched segments 54 and 55 are attached to the brackets 42 and 43 and the frame bars 44—44. Operating levers 56 and 57 are pivotally connected to the notched segment by the bolts 58 and 59. The bent ends 60 and 61 of the levers extend in an upward direction as shown in Figs. 1 and 4. The extremities a and b of the bent ends of the operating levers are turned at right angles to the sides of the levers and pivot pins 62—62 provided with ears 63 and 64 are connected thereto. Curved rods 65 and 66 at one end of their extremities are bent at right angles to the body and inserted in suitable apertures in the ears 63 and 64 thereby pivotally connecting them to the bent ends a and b of the operating levers.

Connecting collars 67 and 68 provided with bosses having horizontal apertures are fitted and fastened to the ends 28 and 29 of the axles. Flat rods 69 and 69' are provided with hooks 70 and 70' on one end to engage the horizontal apertures in the bosses of the connecting collars and their opposite ends are screw-threaded. The curved rods 65 and 66 are screw-threaded and turnbuckles 71 and 72 are connected to the threaded ends of the curved rods and the threaded ends of the flat rods pivotally and adjustably connecting the operating levers to the connecting collars for balancing the beams and regulating the depth or penetration of the cultivating devices in the soil.

Connections 73 and 74 are provided with plates 75 and 76 having apertures to engage the hooked ends of the lifting rods 78 and 79. The free ends of the lifting rods pass through the ears 80 and 81 of slidable clamps 82 and 83 which are fitted to the beams. A series of apertures 84 and 85 are provided in the lifting rods and washers 86 and 86' fitted thereto and held in place by cotter-pins 87 and 88. Coil springs 89 and 90 are interposed between the ears 80 and 81 and the washers 86 and 86' exert a downward pressure on the beams when forced in the soil by the operating levers.

The free ends of the lifting rods extend through the apertures formed in the ears 80 and 81. Coil springs 91 and 92 are connected to the flat rods 69 and 69' on one end and to sliding connections 93 and 94 on the opposite ends to assist in lifting in the beams. Releasing levers 95 and 96 are slidably connected to and carried by the operating levers 56 and 57 and are provided with spring pressed pawls 97 and 98 which engage the notched segments 54 and 55 to maintain the beams in their idle positions and to adjust the cultivating devices to regulate their penetration in the soil.

An equalizing bar 99 is mounted on the tongue and held in place for pivotal movement by the strap 100 and bolts 101 and 102. The equalizing bar pivots upon the bolt 103. Hitch bars 104 and 104' are connected to the equalizing bar as shown or in any other well know manner. One end of the draft bar 105 is pivotally connected to the free ends of the hitch bars and the opposite ends are connected to the journal bearings 7 and 8 by the bolts 106 and 106'. Braces 107 and 107' are attached to the ears 31 and 32 on one end and the opposite ends are secured to the axles 1 and 2 by the through-going bolts or rivets 108 and 108' to maintain the vertical pivot sleeve at right angles with the axles 1 and 2. The shanks 109 of the cultivating devices are securely clamped to the beams by the clamps 110—110'.

The operation is as follows: When it is desired to cultivate the soil, the operating levers 56 and 57 are manipulated in a vertical direction upon their pivotal supports. The forward end of the beams being connected to the operating levers, a vertical movement is imparted to the beams increasing or decreasing the depth or penetration of the cultivating device in the soil. It will, of course, be understood that the beams under normal condition ride substantially on a plane with the cultivator. The operating levers 56 and 57 are provided with releasing and locking levers 95 and 96 to maintain the operating levers in their proper relation to the soil and can be adjusted to increase or decrease the depth of the cultivating devices in the soil or in maintaining them in idle position for transportation, corner turning or the like as shown in Fig. 4. The wheels and beams are simultaneously turned to dodge a crooked row of corn or the like and obstructions by the operator placing his feet on the stirrups 40 and 41 and pressing forward. When one stirrup is pressed forward the other is moved in the rearward or in the opposite direction as they are connected together by the link bar 35. The vertical sleeves 4 and 5 are connected to the axles 1 and 2 and to the right angled levers 38 and 39, the wheels 3 and 4 and the beams 26 and 27 move in a lateral direction at the same time and maintain the same relative position to each other.

What I claim is:—

1. A cultivator comprising a frame, axles, wheels maintained on said axles, beams pivotally connected at their forward ends to the free ends of the axles for vertical movement, means connected to the frame and the free ends of said axles to impart vertical movement to the beams.

2. A cultivator comprising a frame, axles having projecting portions, wheels maintained on said axles, beams pivotally connected at their forward ends to the projecting portions of said axles for vertical movement, means connected to the frame and the axles to impart vertical movement to the beams, and to balance the beams with the connecting mechanism.

3. A cultivator comprising a frame, axles having forwardly projecting portions, wheels mounted on the axles, beams pivotally connected at their forward ends to the forwardly projecting portions of the axles, vertical sleeves mounted on the axles, means to connect the vertical sleeves together.

4. A cultivator comprising a frame, axles having forwardly projecting portions, wheels mounted on the axles, beams pivotally connected at their forward ends to the forwardly projecting portions of the axles, vertical sleeves mounted on the axles, means to connect the vertical sleeves together, means to pivot the beams and wheels for lateral and vertical movement.

5. A cultivator comprising a frame, axles Z shaped, wheels mounted on said axles, beams pivotally mounted at the forward ends on free ends of said axles, means to impart vertical movement to said beams, means to impart simultaneous lateral movement to the wheels, axles and beams as described and set forth.

6. A cultivator comprising a frame, axles having forwardly projecting portions, wheels mounted on said axles, beams pivotally connected at their forward ends to the projecting portions of said axles for vertical movement, vertical sleeves secured to the axles, means secured to the sleeves to impart a lateral swing to the wheels and beams, the wheel and beam carried by each axle maintaining the same relation to each other at any point of their lateral swing.

7. A cultivator comprising a frame, axles having forwardly projecting portions, wheels mounted on said axles, beams pivotally connected at their forward ends to the projecting portions of said axles for vertical movement, means secured to the axles to impart a lateral swing simultaneously to the wheels and beams, the wheel and beam carried by each axle maintaining the same relation to each other at any point of their lateral swing.

8. A cultivator comprising a frame, axles provided with projecting portions, wheels mounted on said axles, beams pivotally connected at their forward ends to the projecting portions of said axles for vertical movement, means secured to the axles to impart a lateral swing simultaneously to the wheels and beams, the wheel and beam carried by each axle maintaining the same relation to each other at any point of their lateral swing, operating levers carried by the frame, means to pivotally connect the projecting portions of the axles to the operating levers to impart vertical movement to the beams.

9. A cultivator comprising a frame, axles having projecting portions, wheels mounted on said axles, beams pivotally connected at their forward ends to the projecting portions of said axles for vertical movement, pivot sleeves mounted on the axles, a seat lever mounted on the frame, means connected to the frame and the axles to throw the wheels, axles and pivot sleeves backward with relation to the plane of the cultivator when the rear ends of the cultivator are raised thereby balancing the beams and their operating mechanism with the weight of the driver on the seat lever.

10. A cultivator comprising a frame, axles provided with projecting portions, wheels mounted on axles, beams pivotally mounted on the projecting portions of said axles, a seat lever mounted on the frame, means to raise and lower the beams, rods to exert a downward pressure against the beams, vertical sleeves connected to the axles, means to connect said vertical sleeves together whereby both are pivoted simultaneously carrying the wheels and beams with them as described and set forth.

11. A cultivator comprising a frame, axles provided with projecting portions, wheels mounted on said axles, beams pivotally connected at the forward ends to the projecting portions of said axles, cultivating devices attached to the beams, vertical sleeves mounted on said axles, means to connect the vertical sleeves for simultaneous movement, means to impart vertical movement to the beams, means of regulating the depth of the cultivating devices in the soil.

12. A cultivator comprising a frame, axles provided with projecting portions, wheels mounted on said axles, beams pivotally connected at the forward ends to the projecting portions of the axles, cultivating devices attached to the beams, vertical sleeves mounted on said axles, means to impart pivotal movement to said sleeves, means to connect the vertical sleeves for simultaneous movement, means to impart vertical movement to the beams, means of regulating the depth of the cultivating devices in the soil.

13. A cultivator comprising a frame, axles having projecting portions, wheels mounted on said axles, beams pivotally connected at the forward ends to the projecting portions of the axles which are ahead of the axles' pivot points, cultivating devices attached to the beams, vertical sleeves mounted on said axles, means to impart pivotal movement to said sleeves, means to connect the vertical sleeves for simultaneous movement, means to impart vertical movement to the beams, means of regulating the depth of the cultivating devices in the soil.

14. A cultivator comprising a frame, axles having projecting portions, wheels mounted on the axles, beams pivotally mounted on the projecting portions of said axles, vertical sleeves mounted on the axles, means to connect said vertical sleeves and means connected to the vertical sleeves to laterally swing the beams and the wheels to travel in the same direction and relation simultaneously.

In testimony whereof I affix my signature in presence of two witnesses.

FREDERICK C. WARNE.

Witnesses:
 JOHN H. COSS,
 PEARL M. ACKERMAN.